Feb. 2, 1943.  C. S. SANDERS  2,309,791
METHOD AND APPARATUS FOR CEMENTING WELLS
Filed Sept. 13, 1940
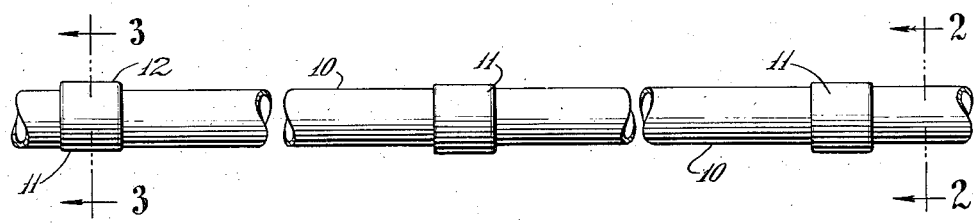
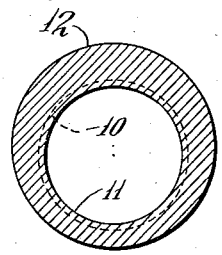
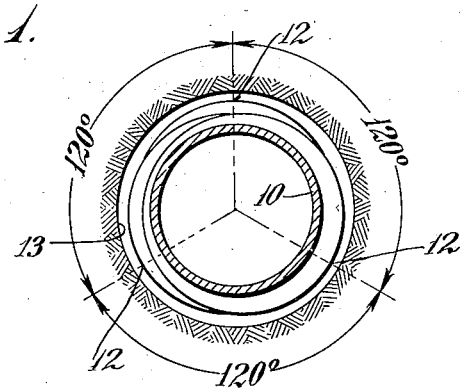
Fig.3.  Fig.2.
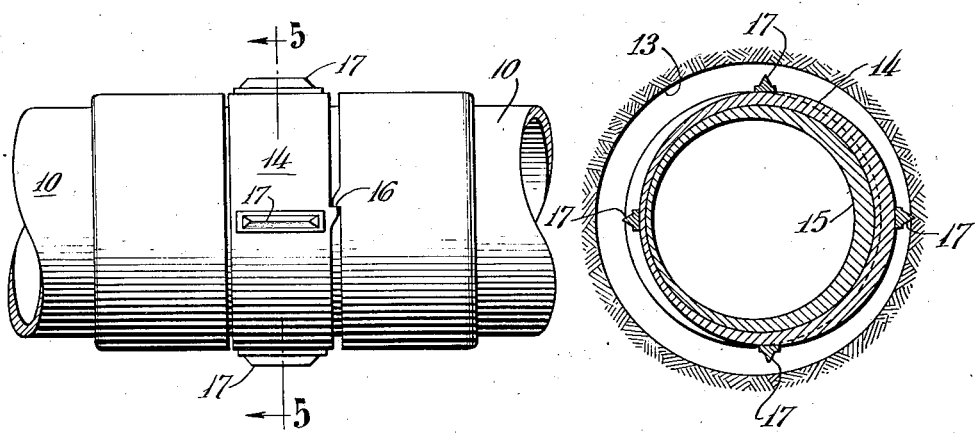
Fig.4.  Fig.5.
Inventor:
Clyde S. Sanders
By Everett A. Johnson
Attorney.

Patented Feb. 2, 1943

2,309,791

UNITED STATES PATENT OFFICE 2,309,791

METHOD AND APPARATUS FOR CEMENTING WELLS

Clyde S. Sanders, Tulsa, Okla., assignor to Stanolind Oil and Gas Company, Tulsa, Okla., a corporation of Delaware Application September 13, 1940, Serial No. 356,677

5 Claims. (Cl. 166—1)

This invention relates to the casing and cementing of oil and gas wells. More particularly this invention relates to a method and apparatus for cementing wells.

Frequently a well is drilled to a point adjacent the productive sands and then a casing comprising jointed sections of pipe is let down into the well. When water is encountered it is common practice to protect the productive sands by cementing the casing to shut off the water, the water being excluded by pumping fluid cement down the casing and causing it to pass upwardly in the hole outside the casing. Proper mud displacement, uniform distribution of sound-bodied cement and absence of channels of any sort in the cement are ideals sought in every casing cement job. After the cement hardens, the cement at the lower end of the casing is drilled through. Hence, if there has been channelling in the annular space between the casing and the walls of the well, there is nothing to prevent mud and water from flowing into the well unobstructed. Thus the effect of the cementing operation is lost as the water is not shut off.

Ordinarily there is a comparatively large difference in the casing diameter and the hole diameter. Due to crooked holes and the considerable length of the casing, the latter is not disposed centrally at all levels in the hole but touches the wall at a number of points. When cement is pumped into the irregular space surrounding the casing the upwardly flowing cement follows that side of the casing where the annulus between the hole and the casing has the greatest cross section. The result is that where the casing touches the wall of the hole a comparatively thin sheath of cement or no cement wall at all is formed, therefore, the cement does not displace all of the mud and cannot envelop the entire casing. Consequently the cement channels through the mud in its upward flow and leaves the casing enveloped partly in mud and partly in cement. Furthermore, the sides of the well generally are irregular in shape or size, and often coated with a thick wall of drilling mud and cuttings. Hence, even in cementing wells where the casing is centered, these mud deposits will cause the cement to channel through it instead of forming a uniform continuous sheath, or the mud will not be completely replaced by the cement resulting in unsatisfactory sealing of the formation.

It is an object of my invention to provide a process and an apparatus for cementing a well which overcome these disadvantages and assure the satisfactory setting and cementing of the casing. It is another object to provide a simple means for pushing the casing away from the walls of the well so that the casing can be completely surrounded by cement. More particularly it is an object of my invention to provide a fitting or coupling capable of imparting shearing stresses to the mud or cement in the space between the casing and the well as the casing is rotated during the cementing operation. These and other objects will become apparent as the description of my invention proceeds.

To attain these objects, the casing is provided with eccentric enlargements. Either by orientation of such enlargements with respect to the casing, by rotation of the casing, or a combination of the two, the casing tends to be centered in the hole, that is, moved away from the wall of the well. These eccentric enlargements or "wobblers" can be carried by or comprised of a coupling, shoe, float collar, or any fitting placed in the casing string. The device makes a contact with the sides of the hole. This contact removes the looser mud and tends to compress the remaining filter cake into a more dense and impervious sheath. Similarly the rotation of these wobblers disturbs the flow of an ascending cement column, tending to force it around on all sides of the casing. This has very marked action towards breaking up any stringers of mud which tend to remain in place as the cement flows upward.

The invention will be more readily understood by reference to the accompanying drawing illustrating the invention wherein:

Figure 1 is an elevation of a casing equipped with couplings constructed and arranged in accordance with my invention;

Figure 2 is a section taken on line 2—2 of Figure 1 showing the relative positions of the high points of the couplings; and also illustrating the positioning of the apparatus in a bore hole;

Figure 3 is a section of a coupling taken through line 3—3 of Figure 1;

Figure 4 is an elevation of a casing equipped with a modified coupling; and

Figure 5 is a section of the coupling taken along line 5—5 in Figure 4.

Referring to Figure 1, the sections of the pipe which make up the casing 10 are joined by means of couplings 11 which have the outside diameter eccentric to the center of the casing as shown in Figure 3. The amount of eccentricity will depend in part at least upon the minimum thickness of cement sheath which is found to be desirable. The high side 12 of the eccentric coupling 11, i. e., the point on the eccentric enlargement farthest from the center line of the casing 10, can as a maximum be made approximately equal to the radius of the well bore. These couplings can be used in groups of three or more and such groups spaced throughout the length of the casing. Likewise one or more concentric couplings may be placed between the groups or between the eccentric couplings making up the groups. When groups of three couplings are assembled on the casing string, best results are obtained by turning each coupling so that its high side 12 is 120° from the corresponding points of adjacent eccentric couplings as illustrated in Figures 1 and 2. However, if several eccentrics are spaced along the casing string with random orientation, they will still be effective in moving the casing away from the walls, making it possible to place the cement on all sides of the casing.

Figures 4 and 5 show another type of special coupling in which the centralizing action is obtained by rotating the casing. This coupling or wobbler comprises an eccentric bored sleeve 14 which is free to rotate 180° on the eccentric coupling 15. The stops 16 are provided to prevent the sleeve 14 from turning more than 180° relative to the eccentric coupling 15. By this means the turning of the casing will not permit the center line of the outside diameter of the sleeve 14 to coincide with the center line of the casing 10. Strips 17 of suitable material, for example, co-axial spiral, can be carried by the sleeve 14 so as to drag on the walls of the drilled hole 13 and tend to hold the eccentric sleeve 14 stationary while the eccentric coupling 15 and casing 10 are rotated. Thereby the wobbler sleeve 14 and eccentric coupling 15 assume the position shown in Figure 5. Of course, the equivalent of strips 17 can be formed integral with the eccentric sleeve 14.

In operation of my invention the eccentric couplings or wobblers are arranged on the casing as the latter is lowered into the hole. If desired, the shoe or float collar may have an eccentric enlargement. When the casing is near the bottom of the hole or at any desired depth, it is rotated as it is lowered. The wobbler or eccentric enlargement will then make a rolling contact with the sides of the hole. This has a "puddling" effect on the mud sheath. In the ordinary drilling of well bores by the rotary method, it is generally found that the walls of the well are in poor condition for introduction of cement behind the casing. It is necessary that the cementing be done properly in order to keep foreign fluids or cavings out of the producing hole and in order to seal off and protect strata behind the pipe from leakage or contamination. This puddling effect conditions the well bore for cementing by increasing the size of the hole to the full gauge and at the same time giving a clean bore having a denser and stronger mud sheath. Hence, cement to be placed behind the casing forms a better bond between the casing and formation.

After the casing has been lowered to position in the hole, a cement slurry is pumped through it and travels upwardly between the casing and the well. An ordinary string of casing would lie against the wall of a crooked hole, preventing the cement from entirely enveloping it. A string of casing equipped with eccentrics and rotated by any suitable surface means such as a rotary table while the cement is being placed tends to disperse and remove mud stringers left behind the casing in ordinary cementing jobs. The cam-like action of the eccentrics causes horizontal movement of the casing and tends to push the casing from the wall of the hole thus allowing greater ease of mud displacement. Consequently, the otherwise channeled mud is carried upward by the swirling and flushing action of the fresh slurry. Since the mud channel ordinarily left behind in the annulus is more quickly and completely carried upward, increased soundness of cement body at the bottom of the hole results.

Rotation of the casing coupled with spudding action increases the efficiency of the mixing action but rotating at a speed above normal apparently does not effect a better cement job. Likewise, mud displacement does not increase with excessive linear velocity of the cement.

It is apparent from the above description that my invention provides a new method and apparatus for conditioning the well bore, for centering the casing, and for assisting in the placement of the cement to envelop the casing completely. The embodiments of my invention described herein are given only by way of illustration and it is to be understood that other modifications may be made by those skilled in the art without departing from the spirit of the invention as defined in the claims.

I claim:

1. An apparatus for cementing wells comprising a well casing and eccentric coupling means for controllably wobbling at least a portion of said casing within the well.

2. In combination with a well casing, a coupling with an outer face eccentric to the center line of the well casing.

3. In combination a well casing and a coupling comprising a joint member having an outer cylindrical face eccentric to the center line of said casing, an eccentric bored sleeve over said joint member, stop means on corresponding radii of said joint member and said sleeve adapted to limit the turning of said sleeve in one direction about said joint member, and means exterior of said bored sleeve adapted to engage the wall of the well.

4. The method of cementing a casing in a well which comprises the steps of passing a cement slurry down within the casing, flowing said cement upwardly outside the casing and controllably wobbling the casing within the cementing zone while placing the cement.

5. In the process of casing a well the steps comprising conditioning the face of the well bore by rotating the well casing as it is lowered through at least a portion of the well depth, passing a cement slurry downwardly within said casing, flowing said cement upwardly outside the casing, and controllably wobbling the casing in the cementing zone while placing the cement, thereby effecting improved mud displacement and cementing.

CLYDE S. SANDERS.